United States Patent [19]

Benner

[11] Patent Number: 4,552,664

[45] Date of Patent: Nov. 12, 1985

[54] METHOD AND APPARATUS FOR REMOVING IONS FROM A LIQUID

[76] Inventor: Philip E. Benner, 1739 Randolph Rd., Schenectady, N.Y. 12308

[21] Appl. No.: 608,428

[22] Filed: May 9, 1984

[51] Int. Cl.[4] ............................................... B03C 1/02
[52] U.S. Cl. .................................... 210/695; 204/155; 204/DIG. 5; 210/222; 210/748
[58] Field of Search ............... 210/695, 748, 222, 223; 204/149, 155, 157.1 W, DIG. 5

[56] References Cited

U.S. PATENT DOCUMENTS

| | | | |
|---|---|---|---|
| Re. 25,201 | 7/1962 | Moriya et al. ............... | 204/155 X |
| 2,939,830 | 6/1960 | Green et al. .................. | 210/222 X |
| 3,448,026 | 6/1969 | Benner ......................... | 204/180 R |
| 3,511,776 | 5/1970 | Avampato .................... | 210/695 |
| 3,719,583 | 3/1973 | Ustick .......................... | 210/695 X |
| 3,767,545 | 10/1973 | Lucero ......................... | 210/695 X |
| 3,929,433 | 12/1975 | Lucero ......................... | 210/222 X |
| 4,060,477 | 11/1977 | Benner ......................... | 204/180 P |
| 4,265,746 | 5/1981 | Zimmerman, Sr. et al. ... | 210/222 X |
| 4,265,754 | 5/1981 | Menold ........................ | 210/222 |

Primary Examiner—Richard V. Fisher
Assistant Examiner—W. Gary Jones
Attorney, Agent, or Firm—Joseph V. Claeys

[57] ABSTRACT

The method and system for removing ions from an ionized liquid includes electrically charging the ions, establishing a given flow direction, and applying a magnetic field to the electrically-charged ions causing movement of the ions in the direction of fluid flow. Liquid having higher ion concentration is discharged at a location remote in the direction of flow, and liquid having lower ion concentration is withdrawn near the location of the applied magnetic field.

12 Claims, 4 Drawing Figures

FIG.3
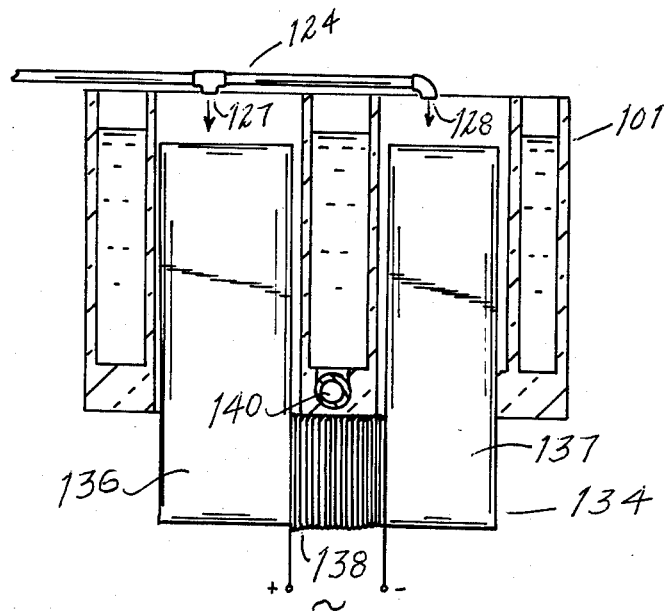
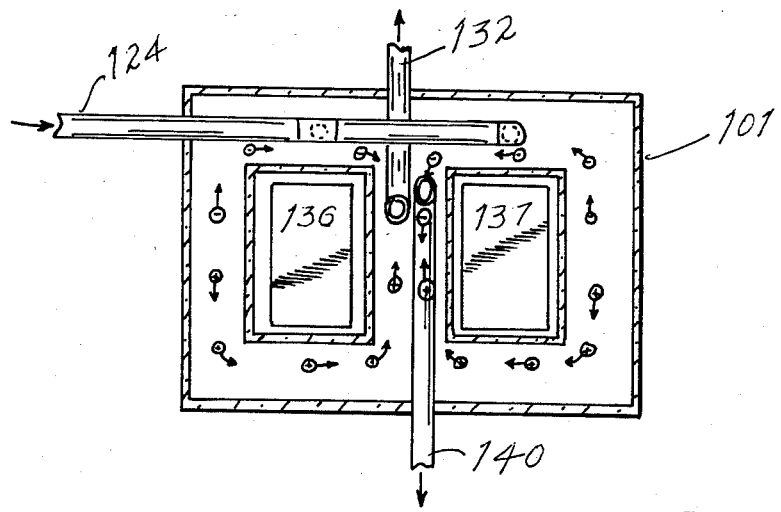
FIG.4

METHOD AND APPARATUS FOR REMOVING IONS FROM A LIQUID

BACKGROUND OF THE INVENTION

The present invention relates to an apparatus and a method for removing unwanted ions from ionized liquids, and more particularly to the demineralization of sea and other saline water.

The desirability of providing new and improved systems for removing ions from liquids, such as for the demineralization of sea and other saline water, has long been recognized. Attempts have been made to achieve this goal using the well known distillation and reverse osmosis processes, as well as various methods which employ electrical energy. Some of the methods which employ electrical energy are electrolysis, electrodialysis, electrophoresis, and electrochemically-controlled ion exchange among others. Also, new and improved electro-mechanical ion transport systems for removing ions from liquids, such as sea water are disclosed in my U.S. Pat. Nos. 3,448,026 and 4,060,477.

Other attempts have employed electromagnetic energy together with a magnetic field, such as disclosed in U.S. Pat. Nos. 3,511,776 and 3,929,433. Also, U.S. Pat. Nos. 4,265,746 and 4,265,754 disclose arrangements which employ a magnetic field in combination with an electrically grounded conduit. In the latter two patents, however, the ions are not removed from the liquid, but rather are transformed into whole molecules. Since the whole molecules are much more stable than their corresponding cations, the water exhibits the properties of soft water despite the fact that the substances which were in the untreated water are still present.

The present invention differs from all of the foregoing as well as from all other systems and methods of which I am aware and provides a new and improved apparatus and method for removing ions from a liquid.

It is an object of the invention, therefore, to provide a new and improved apparatus and method for removing ions from a liquid in a continuous process and with no moving parts.

The novel features believed characteristic of the invention are set forth with particularity in the appended claims. The invention itself, however, both as to its construction and method of operation, together with further objects and advantages thereof, may best be understood by reference to the drawings and to the detailed description set forth below in which FIG. 1 is a vertical section of one embodiment of the invention, FIG. 2 is a vertical section view taken along the lline 2—2 of FIG. 1, FIG. 3 is a vertical section view of another embodiment of the invention, and FIG. 4 is a top view of the embodiment of FIG. 3.

SUMMARY OF THE INVENTION

Briefly stated, in accordance with one aspect of the invention liquid flow is established in a predetermined direction. The ions in a selected region of the flowing liquid are electrically charged and a magnetic field is applied to the electrically charged ions. The magnetic field has a direction and magnitude which causes the electrically-charged ions to be moved in the direction of liquid flow. This movement of ions causes a concentration of ions in the flowing liquid such that the liquid downstream of the applied magnetic field is of higher ion concentration. Liquid is withdrawn from the selected region at a location opposite the direction of movement of the electrically-charged ions to provide a source of liquid of lower ion concentration.

In accordance with another aspect of this invention there is provided an apparatus including a chamber having spaced-apart electrodes arranged therein. Means are provided to cause the liquid from which ions are to be removed to flow through the chamber in a predetermined direction. Means are also provided for connecting the electrodes to a suitable source of electrical potential for electrically charging the ions and establishing an electrical current flow. Means are further provided for applying a magnetic field to the charged ions in the electrode space operative to move such charged ions in the direction of liquid flow in the chamber whereby the liquid downstream of the electrodes has a higher concentration of ions. Means are provided in the chamber near the electrodes and located opposite the direction of ion movement for withdrawing liquid from the chamber of lower ion concentration.

DESCRIPTION OF THE PREFERRED EMBODIMENT

The invention may be carried out with a variety of suitable apparatus. All that is required is that the apparatus be capable of providing a directed liquid flow, electrically charging the ions in a selected region, applying a magnetic field to the electrically charged ions so as to move the electrically charged ions in the direction of liquid flow, and withdrawing from an appropriate location of the selected region, liquid of lower ion concentration. For example, the apparatus may be arranged within a suitable section of a conduit in which the ionized liquid is flowing, or the liquid may be supplied to a suitable vessel arranged to provide for a desired direction of liquid flow, for electrically charging the ions in a selected region of the vessel, and for applying a magnetic field of appropriate magnitude and direction to the electrically-charged ions. To facilitate the explanation of the principals of the invention, it will be described in detail in connection with simplified apparatus embodiments utilizing a suitable vessel for containing a liquid and to which vessel inlet and discharge means are provided to establish a desired direction of liquid flow.

Figure 1:
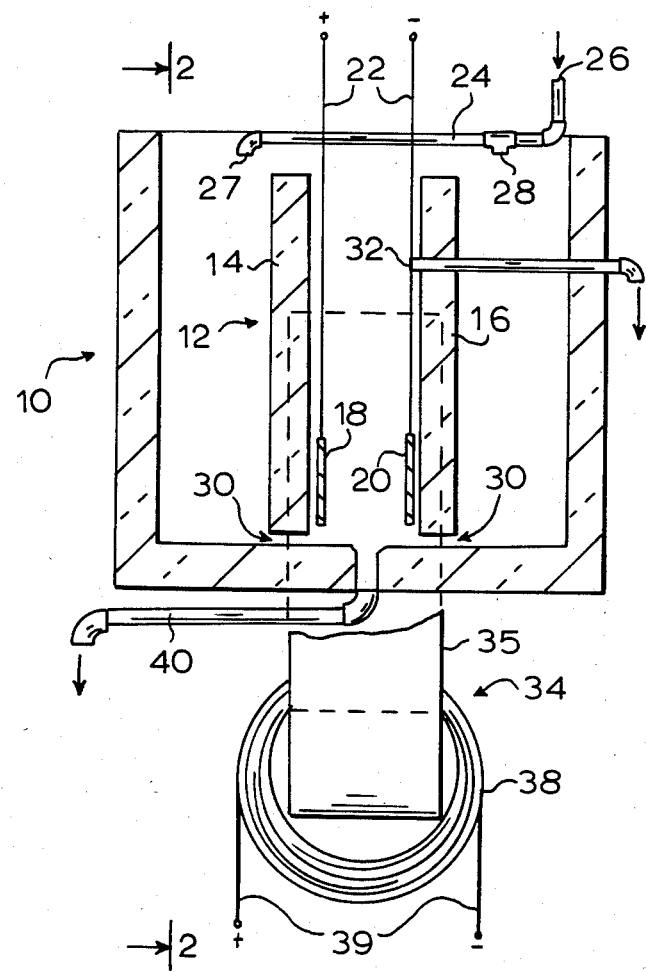
Figure 2:
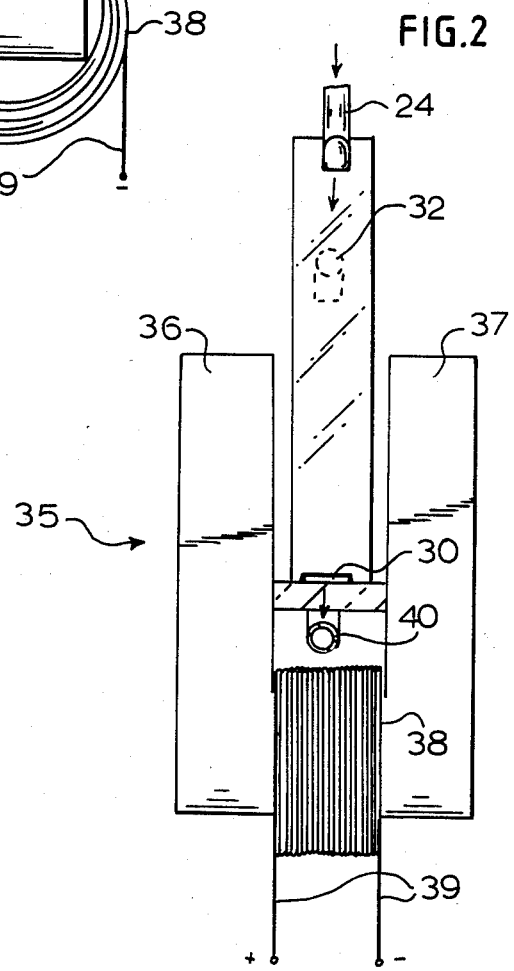

In FIGS. 1 and 2 there are illustrated one embodiment of an apparatus in accordance with the present invention. As shown, the apparatus comprises a vessel 10 for containing a liquid. Vessel 10 may be of any suitable material. Preferably, vessel 10 is of an electrically non-conducting material such as wood, plastic, or the like. Alternatively, vessel 10 may be lined or coated with a suitable electrically non-contacting material.

A chamber 12 is provided within vessel 10. Conveniently, chamber 12 may be formed by partition walls 14 and 16. Spaced-apart electrodes 18 and 20 are disposed within chamber 12 and each is provided with an electrical wire lead 22 for connecting the electrodes 18 and 20 with a suitable source of electrical potential. The electrodes 18 and 20 may be of any suitable material which will not erode excessively in this type application. Anodes of tirrelloy B material and cathodes of hastelloy C material which can be obtained from Ionics, Inc. have been found suitable.

Means are provided to establish liquid flow through the chamber 12 in a predetermined direction. To this end, vessel 10 is provided with a suitable liquid inlet means, shown as a manifold 24 having an inlet end 26 for connection with the source of liquid and a plurality of outlets 27 and 28 for supplying the liquid to the vessel 10. Openings 30 are provided at the bottom of partition walls 14 and 16 to allow liquid from vessel 10 to enter the chamber 12. A discharge means, shown as conduit 32, is provided to the chamber 12 at a location remote in the direction of liquid flow from the electrodes 18 and 20.

Accordingly, with the foregoing described arrangement of inlet and discharge liquid enters manifold 24 at inlet 26 and enters vessel 10 through the manifold outlets 27 and 28. The liquid enters chamber 12 through the openings 30 in the partition walls 14 and 16 and flows past the electrodes 18 and 20 and through the discharge conduit 32. Thus, there is a liquid flow established through chamber 12 in the direction from the openings 30 at the bottom of the chamber 12 and past electrodes 18 and 20 to the discharge conduit 32.

The apparatus also includes means for applying a magnetic field to the liquid in the chamber 12 adjacent the electrodes 18 and 20. The magnetic field can be provided by any suitable means. In FIGS. 1 and 2 the magnetic field is shown as being provided by a suitable U-shaped electromagnet 34 having a core member 35 with legs 36 and 37 and an electrical energizing coil 38. Coil 38 has leads 39 for connection with a suitable source of electrical potential. Preferably, the magnetic field is applied in a direction perpendicular to the direction of liquid flow and has a magnitude sufficient to move the electrically-charged ions in the direction of liquid flow.

An outlet means 40 is also provided in chamber 12 at the bottom region thereof near the electrodes 18 and 20. That is, outlet means 40 is located opposite the direction of liquid flow. When the apparatus is in operation liquid of lower ion concentration than that entering the vessel from manifold 24 is withdrawn from outlet means 40, while liquid of higher ion concentration is discharged through conduit 32.

In operation, ions are removed from the incoming liquid in a continuous process and without any moving parts. Very briefly, this is achieved in accordance with the invention by electrically charging the ions in the liquid and controlling the movement of such electrically charged ions by means of an applied magnetic field in combination with a directed liquid flow. The charged ions are moved in the direction of liquid flow by means of the applied magnetic field and liquid of higher ion concentration moves to the discharge. Liquid of lower ion concentration is withdrawn at a location near the electrodes and opposite in the direction of liquid flow from the discharge.

This is accomplished in the apparatus illustrated in FIG. 1 in the following manner: the liquid from which the ions are to be removed (e.g. a sea water to be made potable) enters manifold 24 and is directed by outlets 27 and 28 on each side of the partition walls 14 and 16 to the bottom of vessel 10. The liquid enters chamber 12 through the openings 30 in partition walls 14 and 16 and flows upwardly past the electrodes 18 and 20 to the discharge 32.

Electrodes 18 and 20 are connected with a suitable source of electrical potential which electrically charges the ions and establishes current flow between the electrodes. The magnetic field applied by the electromagnet 34 causes the charged ions to be moved in the direction of liquid flow and toward the discharge conduit. Since the charged ions are moved in the direction of liquid flow the liquid downstream of the electrodes and the applied magnetic field will have a higher concentration of ions than that of the incoming liquid from manifold 24. This higher ion concentration liquid flows to the discharge 32. The action of electrically charging the ions and by means of the applied magnetic field moving the electrically-charged ions in the direction of liquid flow, creates a region of liquid which is of lower ion concentration. This region or lower ion concentration liquid is withdrawn from chamber 12 through the outlet means 40.

In FIG. 3 there is illustrated another embodiment of the invention. As shown, the apparatus comprises a suitable vessel 101 for containing the ionized liquid. The vessel 101 is provided with a supply manifold 124 for supplying liquid to the vessel through manifold outlet means 127 and 128. Preferably, vessel 101 is of a suitable non-magnetic and non-conducting material such as wood, plastic or the like.

A desired liquid flow is established in vessel 101 by providing a suitable discharge 132 near the upper portion of vessel 101. This way liquid is supplied to vessel 101 by inlet manifold means 124, flows to the bottom of the vessel 101 and then upward to the discharge 132.

An alternating magnetic field is applied to the liquid in the vessel 101 which alternating magnetic field is operating to induce an electrical current in the ionized liquid which electrically charges the ions. By action of the alternating magnetic field on the electrically-charged ions the ions are moved upward toward the discharge 132. That is the electrically-charged ions are moved in the direction of liquid flow.

To this end, the apparatus of FIG. 3 is provided with a U-shaped electromagnet means 134 is provided with a suitable energizing coil 138 having electrical leads 139 for connection with a suitable source of alternating current potential. Preferably, coil 138 is energized from a source of poly-phase alternating current potential.

To prevent liquid leaks from vessel 101, seal means 139 are provided where the legs 136 and 137 enter vessel 101. If coil 138 is provided with suitable electrical insulation, the entire electromagnetic means 134 may be disposed within vessel 101 and the seal problem would be obviated.

Vessel 101 is also provided with an outlet means 140 near the bottom for withdrawing liquid of lower ion concentration.

In operation, ionized liquid is supplied to vessel 101 from inlet manifold 124 and is discharged through discharge 132. The alternating magnetic field applied by the electromagnet means 134 functions to electrically charge the ions by means of an induced electrical current. The alternating magnetic field also causes movement of the electrically charged by a motor-type action upward toward the discharge 132. This combined action results in liquid of higher ion concentration flowing to discharge 132 and liquid of lower ion concentration being available for withdrawal through outlet means 140.

The foregoing has shown and described the fundamental novel features of the invention as applied to a simplified embodiment thereof. Many different types of apparatus together with many changes, modifications and additions to the apparatus illustrated will occur to those skilled in the art. It is to be understood, therefore, that the appended claims are intended to cover all such apparatus, changes, modifications, or additions as fall within the true spirit and scope of the invention.

What is claimed is:

1. A method of removing ions from an ionizing liquid, comprising:
   (a) establishing liquid flow in a predetermined direction;
   (b) electrically charging the ions in a selected region of the flowing liquid;
   (c) applying a magnetic field to said selected region and to the electrically-charged ions therein operative to move said electrically charged ions in the direction of liquid flow whereby the liquid remote in the direction of liquid flow from said selected region is of increased ion concentration;
   (d) discharging liquid at a location remote in the direction of liquid flow from said selected region; and
   (e) withdrawing liquid of lower ion concentration from a location of said selected region near the applied magnetic field.

2. The method recited in claim 1 wherein means for charging said ions comprises a pair of spaced-apart electrodes disposed in said liquid and connected with a suitable source of electrical potential.

3. The method recited in claim 2 wherein said means for electrically charging said ions comprises an electromagnet means energized from a suitable source of alternating current electrical potential.

4. A system for removing ions from an ionized liquid, comprising:
   (a) means for electrically charging the ions in a selected region of the ionized liquid;
   (b) means establishing flow of said liquid in a given direction through said selected region;
   (c) means applying a magnetic field to the electrically-charged ions in said selected region, said magnetic field having a direction and magnitude to cause movement of the electrically charged ions in the direction of liquid flow whereby liquid remote in the direction of liquid flow from the applied magnetic field is of higher ion concentration than is the liquid in the portion of the selected region near the applied magnetic field;
   (d) discharge means communicating with said flowing liquid at a location remote in the direction of liquid flow from said selected region for discharging the liquid of higher ion concentration; and
   (e) outlet means communicating with said flowing liquid near the location of the applied magnetic field for withdrawing liquid of lower ion concentration.

5. The system recited in claim 4 wherein the means for electrically charging the ions in said selected region comprises spaced-apart electrodes disposed in said selected region and means for connecting said electrodes with a source of electrical potential.

6. The system recited in claim 4 wherein the applied magnetic field is in a direction perpendicular to the direction of liquid flow.

7. The system recited in claim 6, wherein the means for electrically charging the ions in selected region comprises spaced-apart electrodes disposed in said selected region and means for connecting said electrodes with a source of electrical potential.

8. The system recited in claim 4 wherein the means for electrically charging said ions comprises means for inducing an electric current flow in the ions in said selected region.

9. The system recited in claim 8 wherein said means for inducing an electric current flow in said ions is an applied alternating magnetic field.

10. A system for removing ions from an ionized liquid comprising:
    (a) means establishing flow of said liquid in a given direction;
    (b) means applying an alternating magnetic field to a selected region of the flowing liquid, said alternating magnetic field being operative to electrically charge the ions in said selected region and which electrically charged ions then interact with said alternating magnetic field and are caused to move in the direction of liquid flow whereby the liquid remote in the direction of liquid flow from said selected region has a higher ion concentration than does the liquid nearer said selected region;
    (c) discharge means communicating with said flowing liquid at a location remote in the direction of liquid flow from said selected region for discharging the liquid of higher ion concentration; and
    (d) outlet means communicating with the flowing liquid in said selected region and near said applied alternating magnetic field for withdrawing liquid having lower ion concentration.

11. The system recited in claim 10 including a vessel for containing liquid, said vessel including partition means defining said selected region and having inlet and discharge means for establishing said liquid flow in a given direction through said selected region, and said alternating magnetic field is applied to said selected region.

12. The system recited in claim 11 wherein said alternating magnetic field is provided by an electromagnet means disposed within said vessel.

* * * * *